Figure 1:
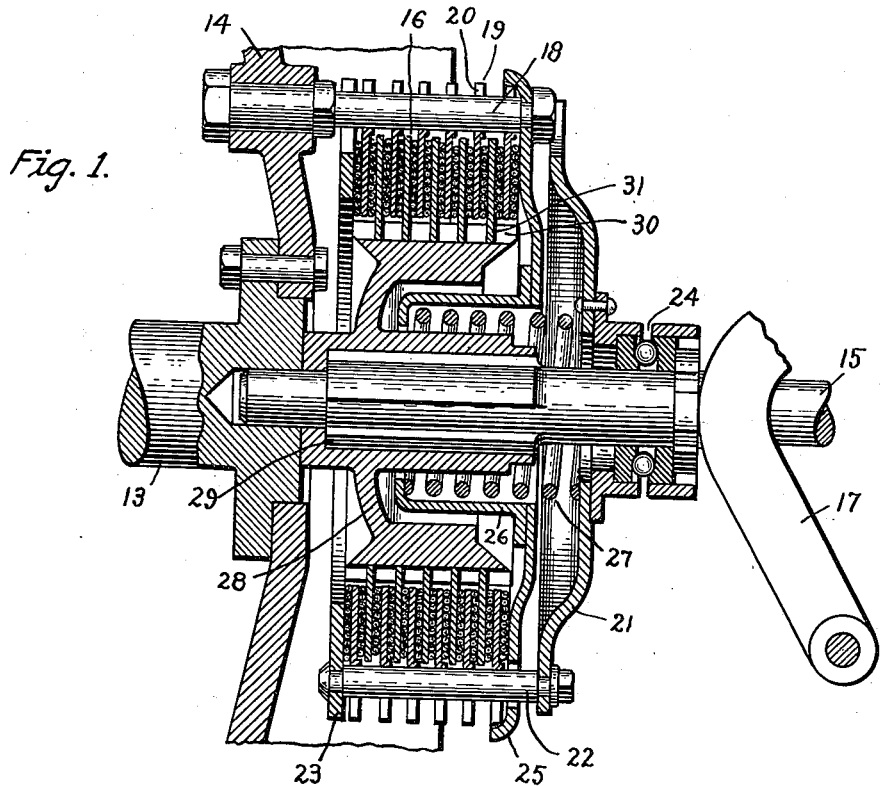

May 6, 1924.

E. J. GUAY ET AL

FRICTION DEVICE

Filed May 12, 1922   2 Sheets-Sheet 1

1,493,433

Inventors,
Emile J. Guay,
Joseph A. Guay,
by their Attorney.

May 6, 1924.
E. J. GUAY ET AL
FRICTION DEVICE
Filed May 12, 1922   2 Sheets-Sheet 2
1,493,433
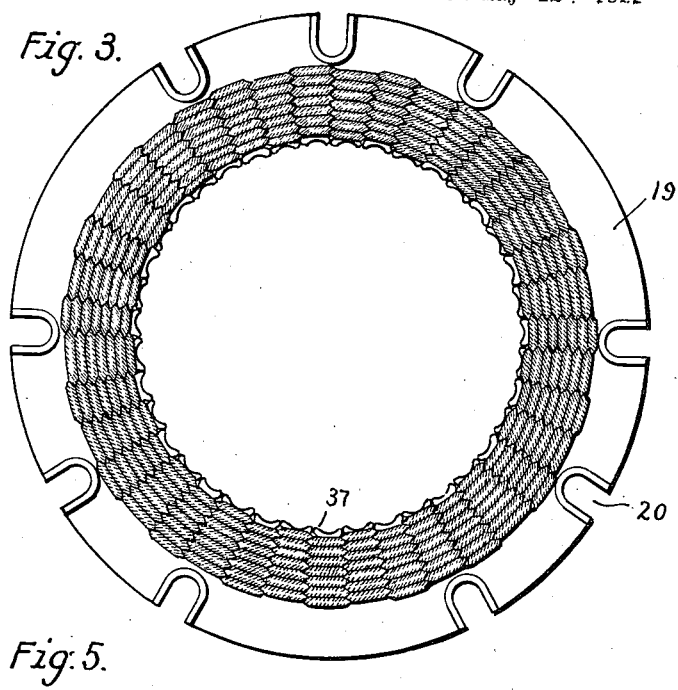
Fig. 3.
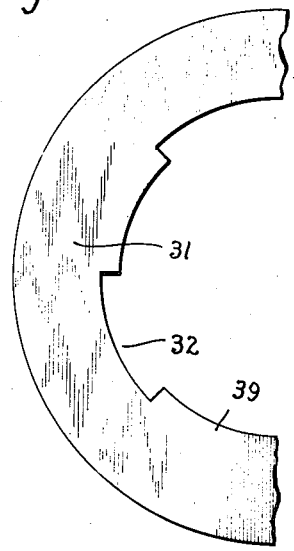
Fig. 4.
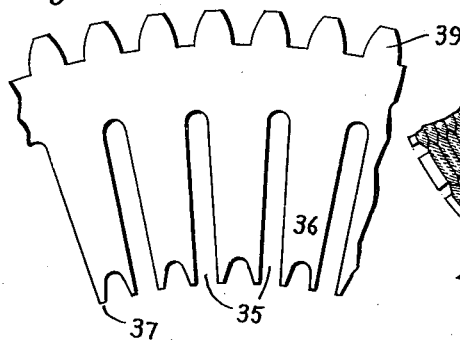
Fig. 5.
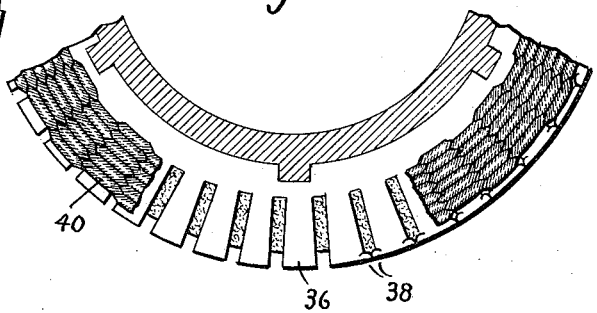
Fig. 6.
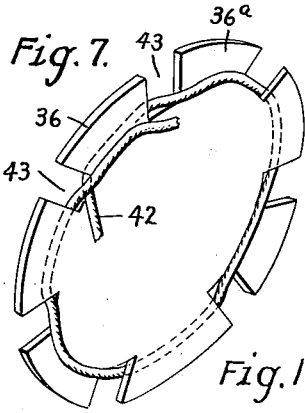
Fig. 7.
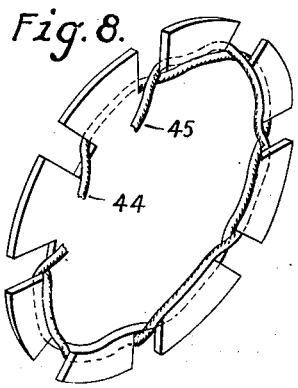
Fig. 8.
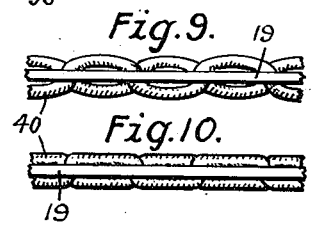
Fig. 9.
Fig. 10.
Fig. 11.
Inventors.
Emile J. Guay,
Joseph A. Guay,
by Alex T. Macdonald
Their Attorney Patented May 6, 1924.

1,493,433

UNITED STATES PATENT OFFICE.

EMIL J. GUAY, OF SWAMPSCOTT, AND JOSEPH ARTHUR GUAY, OF LYNN, MASSACHUSETTS, ASSIGNORS TO REX ENGINEERING COMPANY, A CORPORATION OF MASSACHUSETTS,

FRICTION DEVICE.

Application filed May 12, 1922. Serial No. 560,509.

*To all whom it may concern:*

Be it known that we, EMIL J. GUAY, a citizen of the United States, residing at Swampscott, county of Essex, State of Massachusetts, and JOSEPH ARTHUR GUAY, a citizen of the United States, residing at Lynn, county of Essex, State of Massachusetts, have invented certain new and useful Improvements in Friction Devices, of which the following is a specification.

The present application is a continuation in part of our prior application, Serial No. 357,269 filed Feb. 9, 1920.

The present invention relates to friction devices which are employed either to transmit power from one rotating element to another or to cause frictional retardation of a moving element with respect to another element which latter may be either stationary or movable. One particular application of the invention is to clutches for motor cars for transmitting power from the motor to the driving wheels. More specifically, the invention is directed to what are termed dry multiple disk or plate clutches.

The ordinary multiple disk clutch comprises a driving member and a driven member, each of which is provided with a set of disks, the disks of one set alternating with those of the other set, said sets being attached to their respective supporting members in such manner as to rotate with them. Certain of the disks, as the driving ones, for example, are provided with facings made of a material which stands up well under wear due to friction caused by one set of disks sliding or slipping on the others. Asbestos is generally used for the purpose and is made in the form of rings and fastened to each disk by a relatively small number of rivets, and it is chiefly through these rivets that power is transmitted from one member to the other. As the asbestos in the rings is structurally rather weak, it is customary to reinforce it with woven copper wire to give the necessary mechanical strength which makes the material pretty expensive. In addition, a spring is employed to cause frictional engagement between the disks for operation, and a foot pedal for compressing the spring and permitting the disks to separate axially when it is desired to disconnect the driving and the driven members.

Modern development has produced multi-cylinder engines which are capable of being throttled down to give very low car speeds and as a result a very large number of drivers while driving in congested traffic leave the gears of the gear set in high speed relation and retard the speed of the car and also start up from a standstill by slipping the clutch. That is to say, they open the disks very slightly against the action of the spring and let them slip one on the other. This results in rather quickly wearing the facings of the disks and also the heads of the rivets which fasten the facings to the disks. On account of the fibrous nature of the facings the rivet heads are not made very deep, measured axially of the clutch, nor are they very large in diameter, and as a result, when the heads wear down a certain amount, the facings get loose. As the facings wear they get structurally weaker and tend to pull loose from the rivets, especially if the clutch is let in suddenly. Also, when the rivet heads are exposed due to wear, they engage the companion metal disk and the metal chips resulting therefrom grind the disks and cut the asbestos. When the facings get loose or are badly worn, the car must be laid up for repairs. On account of the location of the clutch on the car, the job of re-facing a clutch is a pretty expensive one, disregarding the time that the car is out of service.

Our invention has for its object to improve the construction of friction devices and especially of friction clutches for motor cars, particular reference being made to increasing their life and to improving the facings and the means of attaching them to their supporting members.

For a consideration of what we believe to be novel and our invention, attention is directed to the accompanying description and the claims appended thereto.

Figure 2:
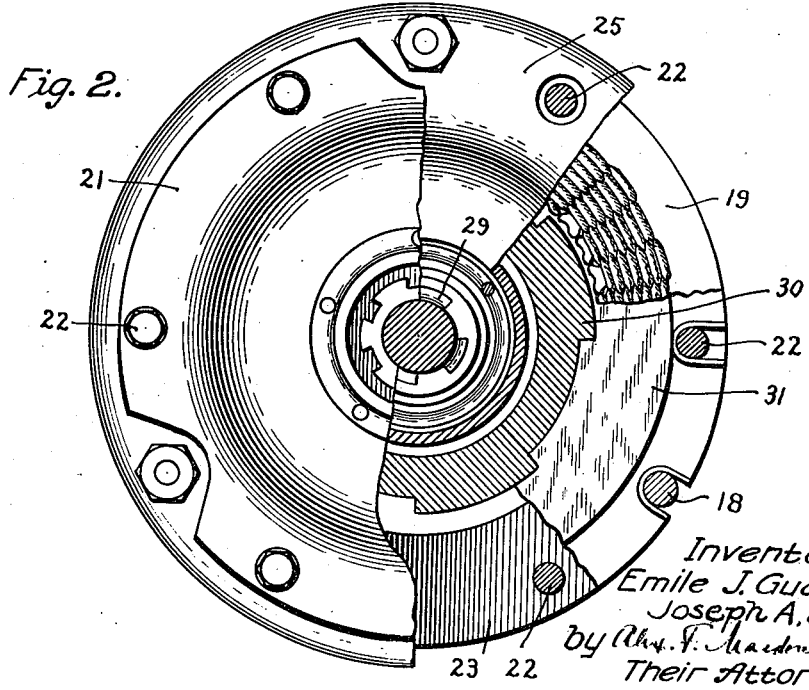

In the drawings which are illustrative of our invention, Fig. 1 is an axial section of a motor car clutch; Fig. 2 is an end view of the same with certain of the parts broken away; Fig. 3 is a side view of a clutch disk or plate and its facing; Fig. 4 is a partial view of one of the plain disks; Fig. 5 is a view of a portion of a clutch or disk plate as it appears prior to receiving its facing; Fig. 6 illustrates another form of the invention in which the facing is applied to the disk from the outside instead of from the inside; Figs. 7 and 8 illustrate different ways of winding the facing on the disks; Fig. 9 illustrates on an exaggerated scale, the condition of the facing on a disk just after being wound; Fig. 10, the same facing after it has been treated and compressed, and Fig. 11 shows an asbestos cord having a central core to increase its strength.

Referring to Fig. 1, 13 indicates the shaft of a prime mover, as an internal combustion engine for example, although it may equally well represent a shaft or element driven in any customary manner. On the shaft and rotating with it is a member 14 which may advantageously be the fly wheel. 15 indicates the driven shaft which is axially aligned with the driving shaft 13. In the present instance, the shaft 15 is an intermediate shaft leading to the gear box, and through suitable gearing, etc., is connected to the road wheels of the motor car. Motion is transmitted from one shaft to the other through the clutch 16. 17 indicates a forked lever arranged to receive a foot pedal for releasing the parts of the clutch when desired. On the web of the fly wheel are mounted torque-transmitting studs 18 which are angularly spaced from each other and are located at the same radial distance from the center of the main shaft. Mounted on these studs are what are commonly termed clutch disks 19 but which are more properly termed rings. These disks are of novel construction as are the facings or linings therefor as will appear later. One of these is shown in Fig. 3. The peripheral recesses or openings 20 therein are just enough larger than the studs 18 to permit the disks to slide back and forth therein but not to turn relatively to the fly wheel. It is through these studs and clutch that the torque of the engine is transmitted to the road wheels when the car is normally operating, and it is also through these same studs that the torque of the road wheels is transmitted to the engine as for example, in going down hill when said engine is being used for braking purposes. 21 indicates a pressed metal head which is provided with a number of clutch releasing studs 22, said studs being connected at their front ends to a ring 23. The head 21 is mounted to move freely on the driven shaft 15. Between it and the clutch pedal lever 17 is a ball thrust bearing 24. The rear ends of the torque-transmitting studs 18 are secured to a head 25 through which the clutch-releasing studs freely pass. To the head 25 is secured a cup-shaped member 26 that forms a seat for one end of the clutch spring 27 which is of the coiled compression type. The rear end of the spring is seated on the head 21. It is on this spring that the amount of the clutching or braking effect, as the case may be, depends. That is to say the force exerted by it determines the point where the clutch begins to slip.

Inside of the clutch and mounted on the front end of the driven shaft 15 is an annular member 28 which is prevented from turning on the shaft by splines 29 formed thereon. The member also has axial splines or keys 30, Fig. 2, on its periphery to receive what are commonly termed plain clutch disks 31 but which are more properly termed rings. A part of one of these disks is shown in Fig. 4, the recess 32 being adapted to receive one of the splines or keys 30 on the member 28.

To release the clutch either to stop the motor car or to permit of a change of gear ratio between the engine and the road wheels, the operator presses the clutch pedal and lever forward which moves the releasing studs 22 forward and also their connecting ring 23. On account of the fact that the position of the disk 25 is fixed with respect to the fly wheel by the studs 18, the ring 23 when moved to the end of its travel will release all of the clutch disks one from the other and those on the driving shaft will turn therewith while the others will come to rest.

Thus far, the general construction described does not differ in substance from well-known arrangements.

The clutch disks which are to receive the facings are of novel construction. As distinguished from the usual plain, flat disks, we employ perforated disks through which the facing, also of novel construction, is threaded and in this manner the disk itself acts as a facing securing means instead of requiring the objectionable rivets. In the simplest and most approved form of our invention, these perforations take the form of parallel sided radial slots 35 having teeth 36 between. The number of the slots and teeth should be odd as distinguished from even, so as to permit of winding the maximum amount of cord in a given space as will appear later. The slots may open into the center of the disk as shown in Fig. 5, or outwardly as shown in Fig. 6. After the winding operation the ends of the slots are closed to hold the winding in place. This is done by deforming the metal of adjacent teeth in such manner as to close or practically close each slot. In Fig. 5 prongs 37 are shown on the teeth which are bent over after the winding is completed. In Fig. 6 the metal of adjacent teeth is squeezed together under heavy pressure as shown at 38.

Owing to the character of the construction, the teeth and slots may be and preferably are formed by a punch press either by one operation or by a series of operations as desired. The advantage of this in the way of reduced cost is obvious. After the punch press operation the corners of the teeth should be sufficiently rounded to prevent cutting of the facing material. The disks are also provided with alternate projections and slots to co-operate with keys, splines or equivalent devices formed on or carried by their supporting member. These projections and slots may also be formed at the same time as the teeth. Fig. 3 shows one arrangement for supporting the disks on its carrying member, i. e., by a few peripheral slots 20 arranged to receive studs 18, Fig. 1. Fig. 5 shows another arrangement wherein the disk has peripheral teeth 39 like a gear which engage similar teeth on the carrying member.

As distinguished from a non-abrasive facing made up of a rather thin, flat ring of asbestos having considerable radial depth and reinforced with woven copper wire, we employ a novel form of facing, comprising asbestos in the form of twine or cord 40. This may be composed of the ordinary commercial grade of asbestos which can be formed into twine or cord and may have one or more strands, or it may be braided, if desired.

Instead of using plain asbestos cord we may, if desired, employ a textile fibre core 40ᵃ as shown in Fig. 11 to increase the strength and form the covering therefor of asbestos. Asbestos has been described as the material used since this possesses the desired qualities for the service intended but we do not intend to limit ourselves thereto in all respects unless it be so specified in the claims, since other material may be used.

Fig. 7 illustrates diagrammatically the method of winding, threading or forming the facing for a disk, the same general procedure being followed whether the cord is wound from the inside or the outside. Starting at 42 the cord is passed through an opening or slot 43 around the back of the disk, in this case, back of a tooth 36, thence through another slot 43 and across the front of the disk, in this case, in front of a tooth 36ᵃ and thence through a slot and around the back of the disk. This operation is repeated until the starting point is reached. If the maximum amount of cord for a given slot area is to be applied to the disk it means that the turns on both the back and front of each tooth must entirely cover it and be in close contact. In the simplest embodiment of the invention, an odd, as distinguished from an even number of teeth permits of the use of a single cord as best shown in Fig. 7 where the cord starting at 42 passes backward through a slot to the back of the first tooth whereas the cord as it emerges from the same slot after a complete turn passes in front of said tooth. This permits the front and rear faces of each tooth to be completely covered with the facing.

The slots between the teeth are narrow as shown in Figs. 5 and 6, being only slightly wider than the diameter of the cord. As an example but not as a limitation of the invention, if the cord is one-eighth of an inch in diameter, the slot may be five thirty-seconds of an inch wide. Owing to the crossing of the cord in each slot or opening in passing from the front to the back, it follows that there is twice the amount of material in each opening or slot as there is on a single face of a tooth. To attain this result the cord must be pressed down hard in said slots and preferably after each passage. This packing of the cords in the slots has the effect of securely anchoring them in place but as an additional means the adjacent edges of each pair of teeth are deformed to close or practically close each slot as indicated at 38. The effect of this is to convert what were open slots before into what are virtually rectangular holes or openings each packed full of asbestos or equivalent material. When the slots are made as in Fig. 6 the closing of their outer ends also prevents the cord from moving outwardly due to the effects of centrifugal force. In starting the winding operation the inner end of the cord can be temporarily held in any suitable manner and as soon as the second turn overlaps the first it will be securely held. The outer or final end can be temporarily held by any suitable means until after the ends of the teeth are deformed or otherwise manipulated.

Fig. 8 shows an arrangement whereby a disk having an even number of teeth and intervening slots may be wound in such manner that the same amount of cord appears on opposite faces of the teeth. This requires two cords, one starting behind the other as by one slot for example, and is not so easy to apply. A disk so wound is therefore more expensive. 44 indicates the starting point of one cord and 45 the starting point of the second cord. By this arrangement one cord passes in front of a tooth and another cord in the rear of the same tooth.

Fig. 9 illustrates in an exaggerated manner the appearance of a disk after being wound. It is then preferably treated in an asphaltum compound, then dried in an oven at about 150° C. and finally put in a hydraulic press and subjected to say, five tons pressure per square inch for a few minutes and at a temperature of about 175° C. The above figures are given merely as illustrations and not as limitations of the invention. This treatment imparts to the facings the proper thickness and density so that all disks when finished will be alike. Fig. 10 illustrates in edge view a portion of a disk after being treated in the manner described.

This treatment has the effect of making the winding waterproof, that is to say, it will not be affected by moisture. The compound also fills the minute spaces between fibres, assists in transmitting heat from the asbestos to the metal of the disk and increases the life of the disks. The asbestos is a fairly good conductor of heat and the fact that it is packed hard in the slots assists in transmitting heat due to friction to the disks where it is dissipated either directly to the surrounding air or through the metallic supports for the disks or both.

There is one point which we particularly wish to emphasize and that is, the very large number of torque-transmitting points of attachment. Every tooth is such a point since every part of a turn extending across a tooth is securely anchored at both ends. As a result of this, the facings can be used until they are worn much thinner than is possible with those of ordinary construction. All objectionable cutting of the facings and plain disks due to metal chips, as in the prior constructions, is avoided because of the absence of rivets. Since both sides of the disks are alike they can, if worn more on one side than on the other, be reversed, which has the effect of substantially increasing the life.

The feature of first making open-ended slots and then closing them greatly simplifies the winding or threading operation since it permits the cord to pass into the slot from one end. This permits the use of facing material taken from a reel as distinguished from using short lengths. Moreover, it permits of packing a large amount of fibrous material into a small space.

One way to view the invention is that the working or friction face of the disk forms a woven fabric, the warp of which is formed by the metal teeth and the woof by the cord. Owing to the arrangement the warp or metal is fully covered at all times and that portion of the cord or woof lying on the face of each tooth or warp portion is securely anchored at each end. Tests have shown that the cord may even be worn off entirely at certain points without destroying the remaining portions. Furthermore, the arrangement of the teeth which project beyond the friction covering is such that they serve to dissipate the heat due to friction which would otherwise make the disk very hot.

Although our invention has been specifically described in connection with a friction device for transmitting motion from one member to another, it should not in its broader aspects be construed as limited thereto. For example, the construction and arrangement of the co-operating woven and plain disks renders them suitable for use where it is desired to retard or brake one member with respect to the other. The same features which make the construction a desirable one for the soft, easy pick-up of speed and load, one member from the other, also ensures an easy but certain retarding effect where employed in a brake.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim to be new and desire to secure by Letters Patent of the United States, is:—

1. A friction element of the character described, comprising a metallic supporting member and a working face made of fibrous material, characterized by the fact that the working face is in the form of a woven fabric of which the metallic member forms the warp and the fibrous material the woof.

2. A friction element comprising a disk having teeth and a working face made of fibrous material, characterized by the fact that the working face is in the form of a woven fabric of which the teeth form the warp and the fibrous material the woof.

3. A friction element comprising a metal disk having a large number of radial teeth and a working face made of fibrous material, characterized by the fact that the working face is in the form of a woven fabric of which the fibrous material is the woof and the teeth the warp, said teeth projecting beyond the working face to dissipate the heat due to friction.

4. A friction element comprising a metallic member having a plurality of teeth and intervening slots with a cord facing therefor of fibrous material which cord alternately passes over a tooth and through a slot until said teeth are covered on both sides thereby.

5. A friction element comprising a disk having teeth and intervening slots with a fibrous covering for each of the teeth, the covering on each tooth pressing on that of the adjacent teeth and acting as a means to anchor the same in place.

6. A friction member comprising a metallic supporting element having openings therein and a strip of friction material which is laced through the openings and over the intervening parts to form a friction surface, portions of the strip crossing each other in each of said openings.

7. A friction element comprising a disk having a plurality of outwardly extending teeth and intervening slots with a cord facing therefor, said cord being wound zig-zag over the teeth and through the slots and appearing on opposite sides of the disk in rows, adjacent layers of cord passing through the slots in opposite directions, each length of cord which covers a tooth being anchored at both ends by the walls of the slot through which it passes.

8. A friction element comprising a perforated metal disk and a double facing therefore comprising a body of fibrous material which is wound in layers, portions of each of the layers passing through perforations and covering portions of the disk on opposite sides.

9. A friction element comprising a disk containing slots and a facing therefore comprising a cord which is wound zig-zag through the slots to form layers, adjacent layers being in contact with each other in the same slot.

10. A friction element comprising a slotted disk and a facing therefor comprising a cord of fibrous material which passes through the slots in succession, appearing first on one side of the disk and then on the other, the adjacent turns of the cord passing through the slots in opposite directions.

11. A friction element comprising a disk having teeth and intervening slots and a facing therefor comprising a cord of fibrous material which is wound around the teeth, the cord passing through the slots in such manner that there are twice as many cords in each slot as there are on each face of a tooth.

12. A friction element comprising a disk having an odd number of teeth with intervening slots and a facing therefor which comprises a cord which is wound back and forth through the slots, alternately appearing on the front face of the disk and then on the back, said cord being arranged to form concentric rows or turns.

13. A friction member comprising a circular metallic element having slots therein and a strip of friction material which is wound through the slots and over the intervening parts to form concentric layers, portions of the strip crossing each other in each slot, each short length of friction material being anchored at its ends by the walls of the slots and also by the material in the adjacent layers.

14. A friction element comprising a metal plate having radial teeth and intervening slots, said teeth being wound with a facing material which passes through the slots and is anchored by the walls thereof against circumferential movement, the adjacent outer ends of the teeth being deformed to partially close the slots to hold the facing in place.

15. A friction member comprising a disk having an odd number of radially extending teeth with intervening slots and a facing therefor which is wound back and forth through the slots, appearing first on the front of one tooth and then on the back of an adjacent tooth, the portion of the cord between the teeth having a greater density per unit of cross section than that on the faces of the teeth, said teeth being deformed in the plane of the disk to close the slots sufficiently to hold the cord in place.

16. The method of making clutch disks which comprises forming a disk with radially extending open-ended slots, winding a cord zig-zag through the slots in such manner that adjacent cords in the same slot cross each other until the desired number of turns is obtained and closing the ends of the slots sufficiently to hold the cord.

17. The method of making clutch disks which comprises forming a disk with radially extending open-ended slots, winding a cord zig-zag through the slots until the desired number of turns is obtained, closing the ends of the slots sufficiently to hold the cord, impregnating the cord with a binding material, and finally subjecting the cord and disk to heat and pressure.

18. A friction element comprising a metal disk having a large number of teeth with intervening slots and a working face made of fibrous material, characterized by the fact that the working face is in the form of a woven fabric of which the fibrous material is the woof and the teeth the warp, said teeth which project beyond the working face being deformed to partially close the slots to hold the fibrous material against the effects of centrifugal force and also serving as a means for dissipating heat generated by friction.

19. A friction element comprising a disk having a relatively large number of parallel sided slots with intervening teeth, integral means on the disk causing it to turn with its cooperative member, and a cord facing of fibrous material for the disk which is wound around the teeth and through the slots, the successive turns of said cord being packed hard in the slots so that the walls thereof will act as anchoring means against circumferential movement of said cord.

20. A clutch structure comprising a driving and a driven member, one of said members comprising a rigid, annular supporting element and a friction material laced through a wall of the supporting element to provide a driving surface for engagement with the other member.

21. A clutch structure comprising relatively rotating, annular members one of said members having a friction material laced through a wall thereof to provide a driving surface for engagement with the other member.

22. A clutch structure comprising relatively rotating, annular members, one of said members being slotted and having friction material wound zig-zag through the slots and over the intervening parts to provide driving surfaces on opposite sides thereof and which engage with other members.

23. In a multiple disk clutch, the combination of slotted metal disks, a cord which is woven back and forth through the slots of each disk to form a friction facing therefor, plain surfaced disks interspersed with the first and arranged to engage said facings, and torque-transmitting devices, some of which engage the slotted disks and others the plain disks.

24. A friction device comprising a metallic supporting element having equally spaced radial openings therein, friction material which is laced serially through the openings and over the intervening parts to form layers, said layers constituting a friction surface, that portion of the material which forms one layer crossing in the openings those portions of the material forming adjacent layers, and a second metallic element which is arranged to engaged said surface.

25. A friction device comprising a pair of metallic elements which have a common axis and are arranged for relative angular and axial movements, one of said elements having spaced teeth and slots, a stranded cord of friction material which is threaded through the slots and over the intervening teeth to form a friction surface to engage the other element, means for holding the cord in each slot, and separate supports for each of said elements.

26. A friction device comprising a disk which has radially disposed slots and intervening teeth, a body portion which supports the teeth and has a number of independent means for transmitting torque, a cord which is threaded through the slots and over the teeth to form a friction facing, and means integral with the teeth for holding the cords in the slots.

27. A friction device comprising an element which has spaced slots and intervening teeth, and a body portion which supports the teeth, a cord which is threaded through the slots and over the teeth to form a friction facing, a binding material with which the cord is impregnated, and means additional to the walls of the slots for holding the cord in said slots.

28. A friction device comprising a sheet steel element having teeth and intervening slots, each tooth having an enlarged head at one end, and cord which is wound around the teeth to form a friction facing, there being twice as much cord in each slot as there is on the face of each tooth, said head preventing displacement of the cord.

In witness whereof, we have hereunto set our hands this 9 day of May, 1922.

EMIL J. GUAY.
ARTHUR JOSEPH GUAY.